United States Patent
Koo et al.

(10) Patent No.: US 7,218,942 B2
(45) Date of Patent: May 15, 2007

(54) METHOD FOR TRANSMITTING DIGITAL CHANNEL WITH PRIORITY OF MOBILE COMMUNICATION TERMINAL

(75) Inventors: Bon-Young Koo, Seoul (KR); Young-Shim Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 10/641,152

(22) Filed: Aug. 15, 2003

(65) Prior Publication Data

US 2004/0033802 A1    Feb. 19, 2004

(30) Foreign Application Priority Data

Aug. 16, 2002   (KR) ................. 10-2002-0048556

(51) Int. Cl.
*H04Q 7/20* (2006.01)
(52) U.S. Cl. .............. 455/464; 455/450; 455/432.1; 455/435.3
(58) Field of Classification Search ........... 455/432.1, 455/434, 515, 464, 516, 509, 450, 452.1, 455/455, 447, 435.2; 379/93.31, 93.32
See application file for complete search history.

(56) References Cited

U.S. PATENT DOCUMENTS

| | | | |
|---|---|---|---|
| 5,586,338 A * | 12/1996 | Lynch et al. ............ | 455/433 |
| 6,085,085 A * | 7/2000 | Blakeney et al. ........ | 455/426.1 |
| 6,112,093 A * | 8/2000 | Nordlund .............. | 455/450 |
| 6,415,148 B1 * | 7/2002 | Chiniga et al. .......... | 455/434 |
| 6,539,230 B2 * | 3/2003 | Yen .................... | 455/456.1 |

FOREIGN PATENT DOCUMENTS

| | | |
|---|---|---|
| JP | 2001-189965 | 7/2001 |
| JP | 2002-077325 | 3/2002 |
| KR | 1002283020000 B1 | 8/1999 |

\* cited by examiner

*Primary Examiner*—George Eng
*Assistant Examiner*—Wesley Kim
(74) *Attorney, Agent, or Firm*—Ked & Associates, LLP

(57) ABSTRACT

A method for transmitting a call signal through a digital channel while in an analog area is provided which allows for enhanced speech and transmission quality while in the analog area. When a call is originated in an analog area, a mobile communication terminal scans a most recently used (MRU) table to locate a digital channel which matches a digital channel available in the analog area. If there is a match, the call is placed through the available digital channel. If none of the digital channels in the MRU table matches the available digital channel, then the call is placed through an analog channel.

11 Claims, 3 Drawing Sheets ically pointed out in the appended claims.
METHOD FOR TRANSMITTING DIGITAL CHANNEL WITH PRIORITY OF MOBILE COMMUNICATION TERMINAL

BACKGROUND OF THE INVENTION

1. Field of the Invention

The present invention relates to a method for transmitting a digital channel with priority of a mobile communication terminal, and more particularly, to a method for transmitting a digital channel with priority of a mobile communication terminal capable of searching/transmitting a digital channel with priority which is available for service in an analog field area.

2. Description of the Background Art

In general, a field environment of a mobile communication terminal is divided into an analog field and a digital field. In order to resolve the shortcomings such as a limited capacity and low service quality and performance of an analog system implemented in the analog field, a digital system implemented in the digital field is increasingly used.

Because much time and high cost are required to construct a service network for implementing the digital system, an improvement is made such that a digital cellular phone service can be provided on the basis of an Advanced Mobile Phone Service (AMPS), the analog field and the digital field co-exist in some area.

The AMPS is a typical example of the analog system which provides an analog cellular phone service by using a frequency division multiple access (FDMA) method, is operated at a frequency band of 800~900 MHz and each channel has a 30 KHz band width.

FIG. 1 is a block diagram of a construction of a general mobile communication system.

When a mobile communication terminal 10 is registered for a base station 20, the base station 20 provides various system parameters, a system identification (SID) and a network identification (NID) to the mobile communication system 10. The mobile communication terminal 10 determines a system for receiving a service through a series of processes, and originates or receives a call according to user's selection.

The mobile communication terminal determines the system by using an acquisition record table and a system record table, which are called a preferred roaming list (PRL). The acquisition record table includes an analog/digital mode information, frequency information and a band class information, while the system record table subordinated to the acquisition record table includes SID/NID information, preferred or negative information, a priority or a roaming indicator.

The mobile communication terminal includes a most recently used (MRU) table storing certain channel information used for recently determining a system among information of the acquisition record table.

FIG. 2 is a flow chart of a general system determining method of a mobile communication terminal.

The mobile communication terminal sequentially stores every channel information read from the MRU table in a scan list (step S11), stores every channel information read from the acquisition record table (step S12), and sequentially scans the scan list to try to obtain a service available system.

In this case, the scan list includes only channel information, not SID nor NID.

The mobile communication terminal compares a parameter of the obtained system and information stored in the system record table (step S14). If the corresponding system parameter indicates that the obtained system can be available for service in the system record table, the mobile communication terminal determines it (step S15).

The mobile communication terminal, which is idle in the analog field, performs a searching in order to obtain a digital system every second minutes. At this time, the mobile communication terminal scans a channel to search the strongest signal and then is maintained in the idle state in a system mode of the corresponding channel.

In the conventional art, when the mobile communication terminal in the analog mode originates a call in the analog field, the call originating is performed in the currently obtained analog mode.

Thus, in the case that the call originating is performed in the analog field, a call should be made through an analog channel, causing a problem that a speech quality is degraded.

The above references are incorporated by reference herein where appropriate for appropriate teachings of additional or alternative details, features and/or technical background.

SUMMARY OF THE INVENTION

Therefore, an object of the present invention is to provide a method for transmitting a digital channel with priority of a mobile communication terminal in which a service available channel is searched and transmitted with priority in originating a call in an analog field area.

To achieve at least the above objects in whole or in parts, there is provided a method for transmitting a digital channel with priority in a mobile communication terminal, in which when a call originating is attempted, a calling signal is transmitted through a digital channel identical to a currently obtained digital channel among digital channels existing in a most recently used (MRU) table.

To achieve at least these advantages in whole or in parts, there is further provided a method for transmitting a digital channel with priority in a mobile communication terminal, including: attempting a call origination in an analog area; judging whether there is a usable digital channel by re-scanning the MRU table; and performing a call originating in a digital mode in the analog area if there is a usable digital channel.

To achieve at least these advantages in whole or in parts, there is further provided a method for transmitting a digital channel with priority in a mobile communication terminal, including: determining so as for a mobile communication terminal to support an analog system; inputting a call origination command; re-scanning an MRU table; judging whether a digital channel stored in the MRU table and a currently obtained digital channel are identical; performing a call originating in a digital mode if the digital channels are identical; and performing a call originating in an analog mode if the digital channels are not identical.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

A preferred embodiment of a method for transmitting a digital channel with priority in a mobile communication terminal will now be described.

Figure 1:
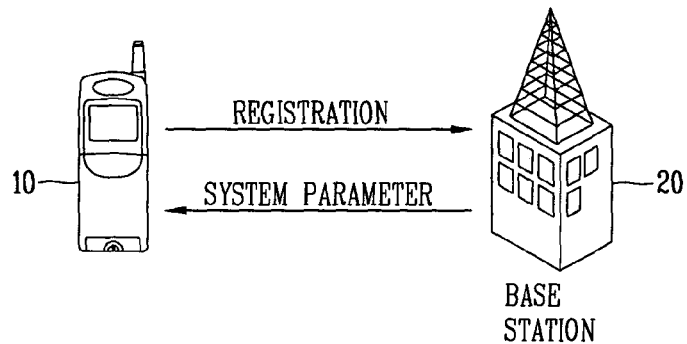
FIG. 1 is a block diagram showing a construction of a general mobile communication system.
Figure 2:
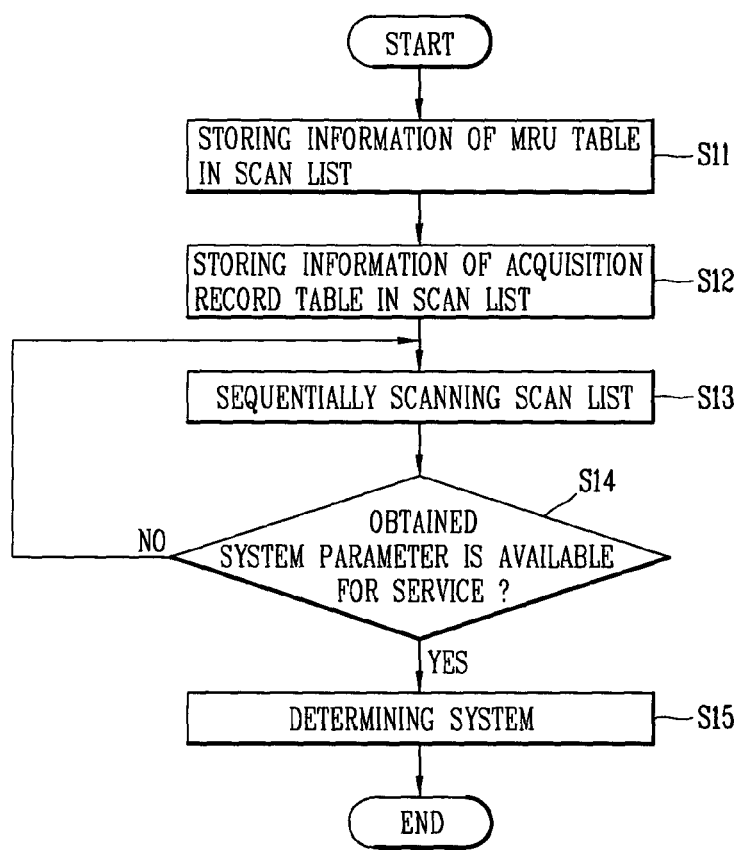
FIG. 2 is a flow chart of a general system determining method of a mobile communication terminal.
Figure 3:
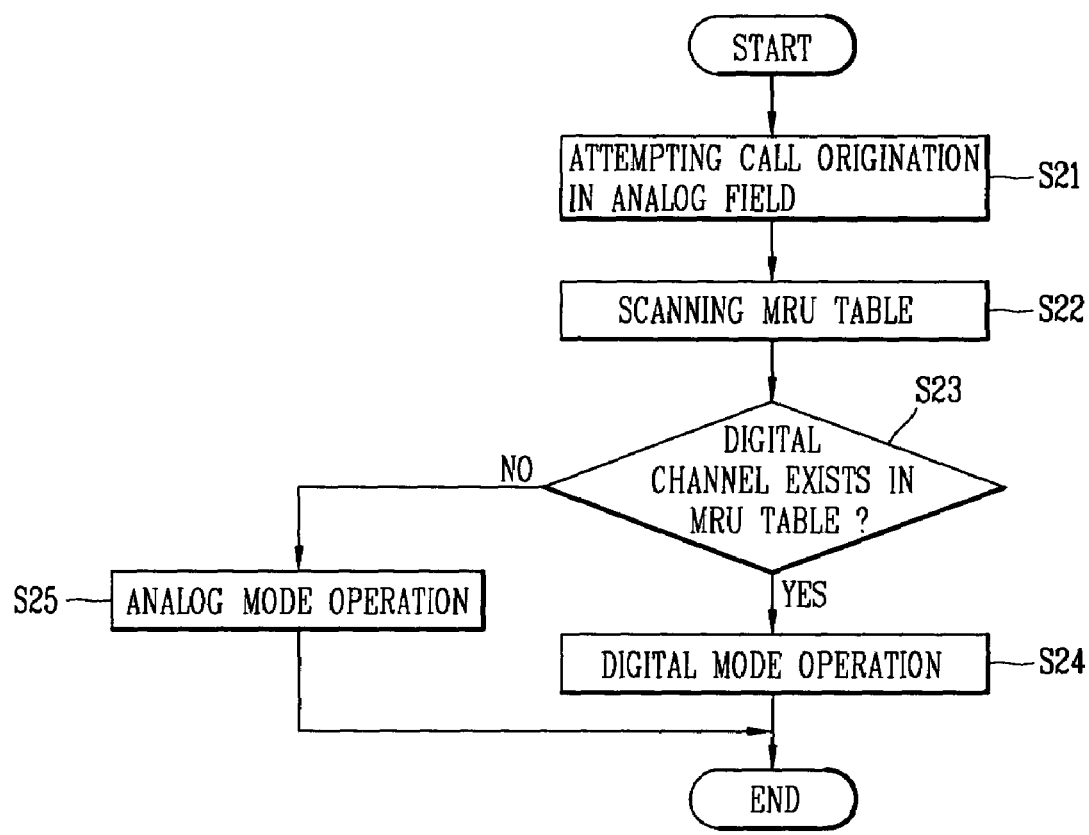
FIG. 3 is a flow chart of a method for transmitting a digital channel with priority in a mobile communication terminal in accordance with a preferred embodiment of the present invention.

FIG. 3 is a flow chart of a method for transmitting a digital channel with priority in a mobile communication terminal in accordance with a preferred embodiment of the present invention.

When a mobile communication terminal, which is idle in an analog field, attempts a call origination (step S21), a mobile communication terminal scans a most recently used (MRU) table (step S22).

The mobile communication terminal checks whether there is the same channel as a digital channel stored in the MRU table among digital channels obtained currently in an analog field (step S23). If there is the same digital channel, the mobile communication terminal performs a call originating through the corresponding digital channel (step S24). If, however, there is no same digital channel, the mobile communication terminal performs a call originating in the currently set analog mode (step S25).

That is, in the present invention, when the mobile communication terminal, which is in an idle state, performs a call originating in the analog mode in an analog area, it re-scans the MRU table to search an available digital channel and performs a call originating through the corresponding digital channel.

Figure 4:
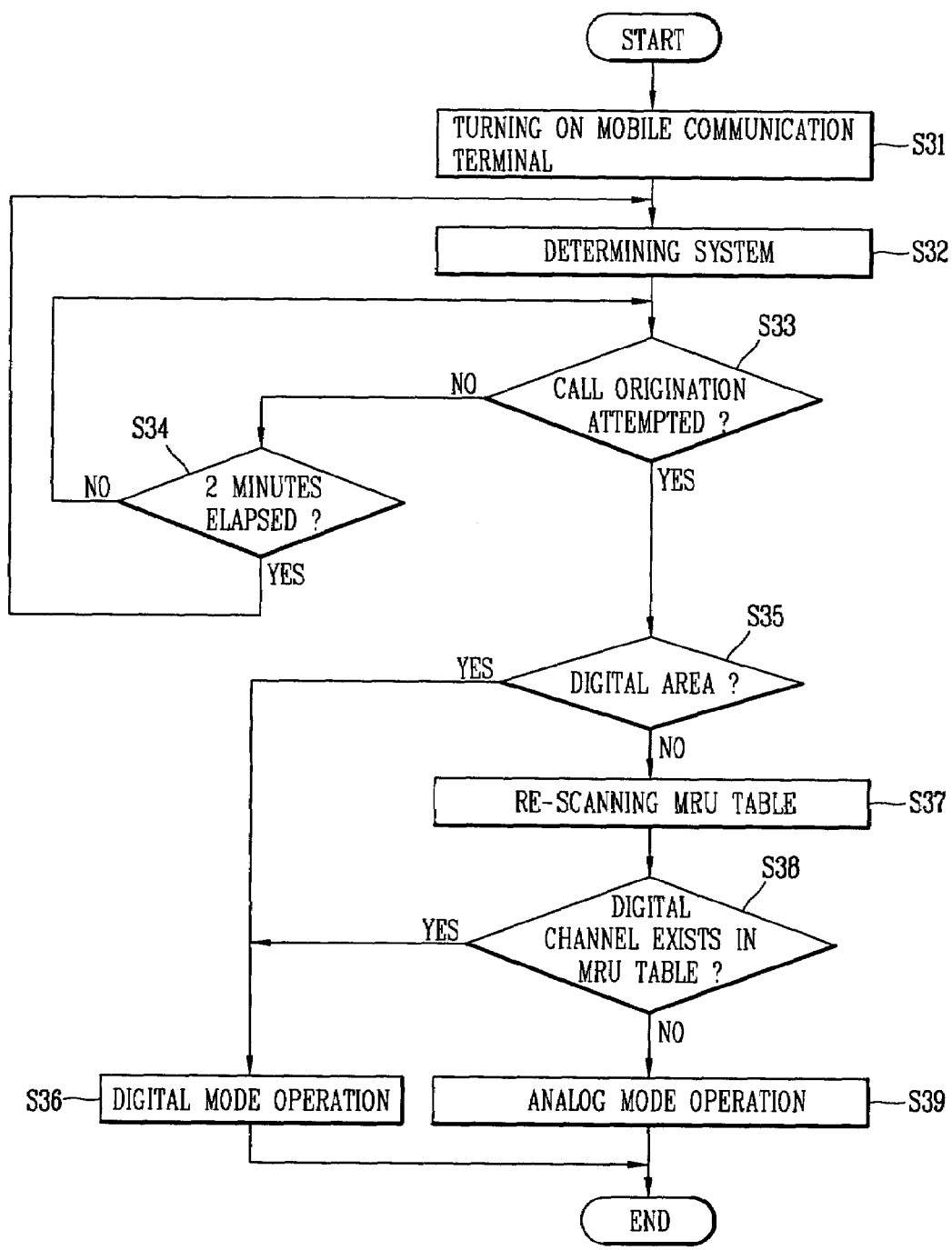
FIG. 4 is a flow chart of a call originating operation of the mobile communication terminal in accordance with the preferred embodiment of the present invention.

FIG. 4 is a flow chart of a call originating operation of the mobile communication terminal in accordance with the preferred embodiment of the present invention.

The operation of the mobile communication terminal will now be described in detail.

When the mobile communication terminal is powered on (step S31), a CPU determines a system through a series of processes (step S32). At this time, if the mobile communication terminal is positioned in an advanced mobile phone service (AMPS) area, an analog field, its mode is determined to be the AMPS mode. Meanwhile, if the mobile communication terminal is positioned in the digital field, the mode is determined as the digital mode.

The mobile communication terminal judges whether a user inputs a phone number through a key pad and attempts a call origination by depressing a call button (step S33). If no call origination is attempted, the mobile communication terminal is maintained idle, and then after 2 minutes elapses (step S34), the series of operations are performed to determine a system (step S32).

When the user attempts a call origination through the mobile communication terminal, the mobile communication terminal judges whether the mobile communication terminal is positioned in the AMPS area or in a digital area (step S35).

If the mobile communication terminal is positioned in the digital area, it performs the call originating in the digital mode (step S36). Meanwhile, if the mobile communication terminal is positioned in the AMPS area, it re-scans the MRU table and makes a scan list (step S37).

The mobile communication terminal judges whether there is the same digital channel as the currently obtained digital channel by itself among the digital channels stored in the MRU table (step S38). If there is the same digital channel, the mobile communication terminal performs a call originating through the corresponding digital channel in the AMPS area (step S36).

If, however, there is no same digital channel, the mobile communication terminal performs a call originating through an analog channel in the AMPS mode (step S38).

That is, in the present invention, when a call origination command is generated in the analog area, the mobile communication terminal first re-scans the MRU table to check whether there is a digital channel identical to the digital channel currently obtained by the system in the MRU table, and if there is the same digital channel, the mobile communication terminal performs a call originating through the corresponding digital channel even in the analog area.

As so far described, the method for transmitting a digital channel with priority in a mobile communication terminal in accordance with the present invention has the following advantages.

That is, for example, first, in case that a mobile communication terminal performs a call originating in an analog area, it searches a digital channel and then transmits a signal through the corresponding digital channel. Thus, a speech quality can be enhanced.

In addition, in a system environment where an analog area and a digital area co-exist, the digital service available area is substantially extended, so that a quality digital service can be provided to more users.

Moreover, without constructing a new digital service network for a digital service, a digital service can be provided. Thus, a cost for a system facility can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting a signal through a digital channel in a mobile communication terminal, comprising:

originating a call by a mobile communication terminal in an analog area;

scanning a most recently used (MRU) table of the mobile communication terminal for an obtained digital channel in response to the call origination in the analog area; and transmitting a calling signal through the obtained digital channel if the obtained digital channel corresponds to a digital channel included in the MRU table, and transmitting a calling signal through an analog channel if there is no digital channel in the MRU table which corresponds to the obtained digital channel.

2. A method of transmitting a signal through a digital channel in a mobile communication terminal, comprising:
- determining if a mobile communication terminal is operating in an analog system;
- receiving a call origination command;
- originating a call in a digital mode if the mobile communication terminal is not operating in an analog system;
- scanning a most recently used (MRU) table of the mobile communication terminal if the mobile communication terminal is operating in an analog system;
- comparing at least one digital channel stored in the MRU table and a currently obtained digital channel;
- originating a call in a digital mode if the comparing indicates that the currently obtained digital channel is listed in the MRU table; and
- originating the call in an analog mode if the comparing indicates that the currently obtained digital channel is not listed in the MRU table.

3. The method of claim 2, wherein the analog system is an Advanced Mobile Phone Service (AMPS) system.

4. The method of claim 2, wherein originating a call in a digital mode comprises transmitting the call through a digital channel in an analog area.

5. The method of claim 1, wherein originating a call comprises originating a call in an analog area.

6. The method of claim 5, wherein the analog area is an advance mobile phone service (AMPS) area.

7. The method of claim 1, wherein the MRU table includes information related to most recently used channels.

8. The method of claim 1, wherein the calling signal is transmitted through a digital channel if both a digital channel and an analog channel are available.

9. The method of claim 2, wherein determining if a mobile communication terminal is operating in an analog system comprises repeatedly re-determining if the mobile communication terminal is operating in an analog system until a call origination command is received.

10. The method of claim 2, wherein the MRU table includes only information related to most recently used channels.

11. The method of claim 2, wherein the call is originated in a digital mode if both a digital channel and an analog channel are available.

* * * * *